(12) United States Patent
Holloway, II

(10) Patent No.: US 9,365,075 B2
(45) Date of Patent: Jun. 14, 2016

(54) SPINNING RIM ASSEMBLY FOR A WHEEL

(71) Applicant: Charles E. Holloway, II, St. Louis, MO (US)

(72) Inventor: Charles E. Holloway, II, St. Louis, MO (US)

(*) Notice: Subject to any disclaimer, the term of this patent is extended or adjusted under 35 U.S.C. 154(b) by 405 days.

(21) Appl. No.: 13/911,104

(22) Filed: Jun. 6, 2013

(65) Prior Publication Data

US 2013/0328381 A1  Dec. 12, 2013

Related U.S. Application Data

(60) Provisional application No. 61/657,109, filed on Jun. 8, 2012.

(51) Int. Cl.
*B60B 7/20* (2006.01)

(52) U.S. Cl.
CPC ........................ *B60B 7/20* (2013.01)

(58) Field of Classification Search
CPC .......................................................... B60B 7/20
See application file for complete search history.

(56) References Cited

U.S. PATENT DOCUMENTS

| | | | | | |
|---|---|---|---|---|---|
| 1,739,577 | A | * | 12/1929 | Cantu | B60Q 1/326 301/37.25 |
| 2,548,070 | A | * | 4/1951 | Ryan | G09F 21/04 301/37.25 |
| 2,709,228 | A | * | 5/1955 | Miller | H02K 5/10 310/40 R |
| 2,954,629 | A | * | 10/1960 | Matin | B60B 7/20 40/587 |
| 2,997,344 | A | * | 8/1961 | Whiteman | B60B 7/20 301/37.25 |
| 3,005,906 | A | * | 10/1961 | Butler, Jr. | B60B 7/20 301/108.1 |
| 3,611,601 | A | * | 10/1971 | Stropkay | G09F 19/10 40/587 |
| 3,722,958 | A | * | 3/1973 | Marshall | B60B 7/20 301/37.25 |
| 4,089,618 | A | * | 5/1978 | Patel | F04D 29/668 416/228 |
| 4,678,239 | A | * | 7/1987 | Matsushita | B60B 7/20 301/37.25 |
| 5,290,094 | A | * | 3/1994 | Gragg | B60B 7/20 301/37.108 |
| 5,659,989 | A | * | 8/1997 | Hsiao | G09F 21/045 301/37.109 |
| 6,488,342 | B1 | * | 12/2002 | De Paiva | B60B 7/0013 301/108.1 |
| 6,554,370 | B2 | * | 4/2003 | Fowlkes | B60B 7/20 301/37.101 |
| 6,663,187 | B2 | * | 12/2003 | Fitzgerald | B60B 7/20 301/35.629 |

(Continued)

*Primary Examiner* — Brodie Follman
(74) *Attorney, Agent, or Firm* — Buckingham, Doolittle & Burroughs, LLC

(57) ABSTRACT

A wheel rim cover assembly for use with a vehicle wheel rim is provided. The wheel rim cover assembly comprises a rim cover element, a rotating element, and a controller element. The rotating element comprises at least one blade that is rotatable in speed and moves in a direction independent from the rotation of the vehicle wheel rim to which it is attached.

9 Claims, 3 Drawing Sheets

(56) References Cited

U.S. PATENT DOCUMENTS

| | | | | |
|---|---|---|---|---|
| 6,702,395 | B1* | 3/2004 | Wang | B60B 7/20 301/37.108 |
| 6,702,396 | B1* | 3/2004 | Wang | B60B 7/20 301/37.108 |
| 6,776,459 | B2* | 8/2004 | Fitzgerald | B60B 19/10 301/108.4 |
| 6,799,810 | B1* | 10/2004 | Wang | B60B 7/20 301/37.25 |
| 7,014,273 | B1* | 3/2006 | Yang | B60B 7/20 301/37.109 |
| 7,093,909 | B1* | 8/2006 | Korpi | B60B 7/20 301/37.23 |
| 7,100,995 | B2* | 9/2006 | Gilly | B60B 7/20 301/37.25 |
| 7,121,631 | B2* | 10/2006 | Strzelczyk | B60B 7/0026 301/37.108 |
| 7,213,888 | B2* | 5/2007 | Simpson | B60B 7/20 301/37.108 |
| 7,284,801 | B2* | 10/2007 | Wang | B60B 7/12 301/37.32 |
| 7,344,198 | B1* | 3/2008 | Dohm | B60B 7/20 301/37.25 |
| 7,347,504 | B1* | 3/2008 | Huang | B60B 7/20 301/37.102 |
| 7,396,087 | B1* | 7/2008 | Baker | B60B 7/0013 301/37.24 |
| 7,407,033 | B2* | 8/2008 | Wilson | B60B 7/20 180/371 |
| 7,413,260 | B2* | 8/2008 | Gabriel | B60B 7/20 301/37.108 |
| 7,466,049 | B1* | 12/2008 | Vancea | B60B 7/20 180/65.1 |
| 7,503,630 | B2* | 3/2009 | Chester, Jr. | B60B 7/20 301/37.109 |
| 7,726,746 | B2* | 6/2010 | Berens | B60B 7/0013 301/37.108 |
| 7,882,877 | B2* | 2/2011 | Miansian | B60B 1/14 152/427 |
| 7,988,239 | B1* | 8/2011 | Baker | B60B 7/04 301/37.25 |
| 8,328,294 | B2* | 12/2012 | Byers | B60B 7/20 301/37.25 |
| 8,517,474 | B2* | 8/2013 | Salah | B60B 7/04 301/37.25 |
| 8,632,135 | B2* | 1/2014 | Miansian | B60B 1/14 301/37.25 |
| 2003/0075971 | A1* | 4/2003 | Geisel | B60B 7/12 301/37.33 |
| 2004/0183359 | A1* | 9/2004 | Fowlkes | B60B 7/20 301/37.101 |
| 2004/0232757 | A1* | 11/2004 | Hsien-Yu | B60B 7/04 301/37.25 |
| 2005/0035651 | A1* | 2/2005 | Hsiao | B60B 7/20 301/37.25 |
| 2005/0052069 | A1* | 3/2005 | Gilly | B60B 7/20 301/6.1 |
| 2005/0067880 | A1* | 3/2005 | Buhler | B60B 7/20 301/37.35 |
| 2005/0116530 | A1 | 6/2005 | Simpson | |
| 2005/0146202 | A1* | 7/2005 | Lin | B60B 7/20 301/37.25 |
| 2005/0146203 | A1* | 7/2005 | Lin | B60B 7/04 301/37.25 |
| 2005/0146204 | A1* | 7/2005 | Kim | B60B 1/06 301/37.25 |
| 2006/0208559 | A1* | 9/2006 | Morris | B60B 7/20 301/37.25 |
| 2006/0220440 | A1 | 10/2006 | Treacy | |
| 2008/0309150 | A1* | 12/2008 | Edelman | B60B 7/20 301/37.25 |
| 2010/0038956 | A1 | 2/2010 | Byers et al. | |
| 2010/0195054 | A1* | 8/2010 | Gant | G03B 29/00 352/102 |
| 2011/0241413 | A1 | 10/2011 | Uchida et al. | |
| 2013/0076105 | A1* | 3/2013 | Hung | B60B 7/20 301/37.25 |
| 2013/0328381 | A1* | 12/2013 | Holloway, II | B60B 7/20 301/37.25 |

\* cited by examiner

SPINNING RIM ASSEMBLY FOR A WHEEL

CROSS-REFERENCE

This application claims priority from Provisional Patent Application Ser. No. 61/657,109 filed Jun. 8, 2012.

FIELD OF THE INVENTION

This invention pertains generally to a wheel rim cover assembly for a vehicle wheel rim, and more particularly to a spinning variable speed rim cover that can rotate clockwise or counterclockwise independent of the motion of the vehicle wheel.

BACKGROUND

Automobile owners often desire customization of their vehicles to make them stand out from other cars or trucks, or to add a personalized decorative appearance. Standard issued vehicle wheel rims are often plain in appearance. These standard issue rims appear common and uniform and blend into other traffic. After market or customized rims are often used to provide a distinctive appearance depending on the preferences of the user. However, these aftermarket rims are dependant on the vehicle wheel for the spinning motion of the rim. Furthermore, the direction of spin must be the same as the direction that the wheel is spinning.

Consequently, there exists a need for a device to provide customization to a vehicle's rims that is distinctive and may spin independently of the direction that the vehicle's wheel spins. The present invention discloses an assembly for customizing a vehicle's wheel rims. The assembly is universally adaptable to the majority of existing automobile, truck, and sport utility vehicle tires. The assembly allows the user to select a spin direction for the assembly that is either forward or backward. Additionally, the spin direction of the assembly is independent of the spin of the vehicle tire. The user may also adjust the speed of the spin. Depending on the spins of the vehicle tire and the apparatus, the apparatus may create the visual illusion of motion even when the vehicle is stationary. Alternatively, if the apparatus and the vehicle tires are consistently rotating either forward or backward in full motion along with the vehicle movement, a visual illusion is created where the vehicle appears to be floating in mid-motion.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a wheel rim cover assembly for customizing a vehicle's wheels. The wheel rim cover assembly comprises a rim cover element, a rotating element, and a controller element. The rim cover element is selectively attached to one of the vehicle wheels. The rotating element comprises a hub attached to the rim cover element and at least one blade rotatably extending from the hub. The controller element is generally remotely located on an inside of a vehicle for a user to control a spin speed and a spin direction of the rotating element.

Furthermore, in a preferred embodiment, the hub comprises a first portion removeably attached to the rim cover element and that encases a motor. The hub further comprises a second portion rotatably connected to the first portion. A plurality of blades extend form the second portion. The rotating element further comprises a speed control component for selecting a speed of a spin of the second portion, and a directional component for selecting a direction of spin off the second portion. A variety of visual effects are created depending on a speed of the vehicle's wheels, the speed of the spin of the second portion, and the direction of spin of the second portion.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
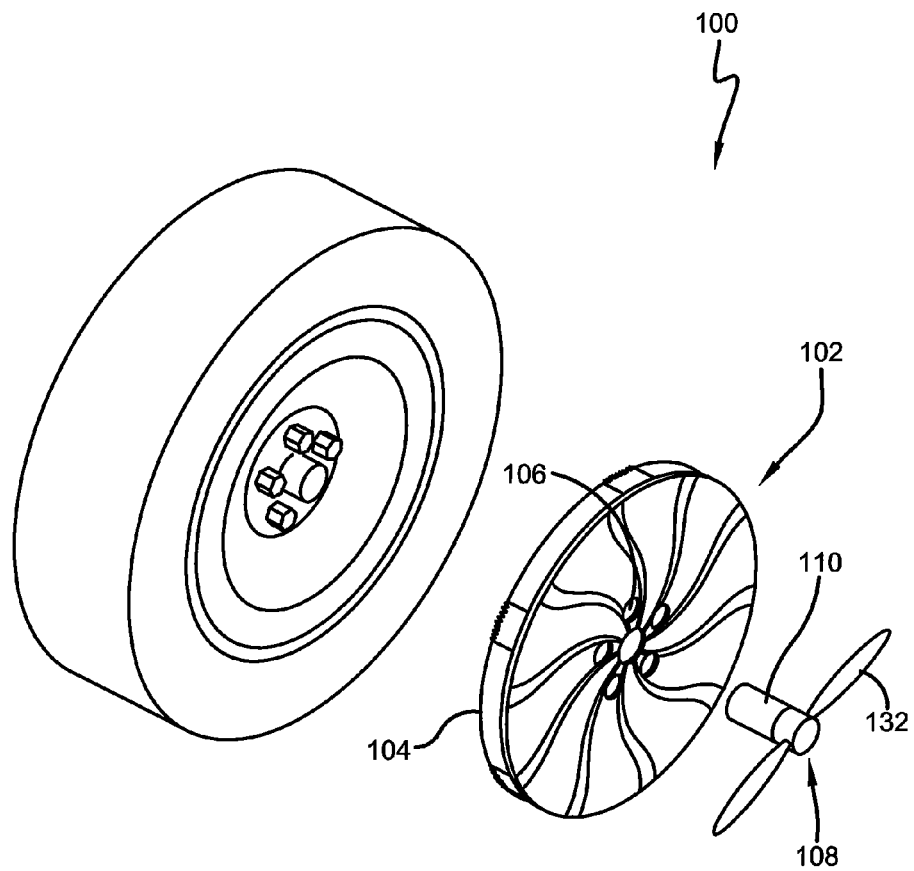
FIG. 1 illustrates an exploded view of a wheel rim cover assembly in accordance with the disclosed architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to a wheel rim assembly for customizing a vehicle's wheels.

Referring initially to the drawings, FIGS. 1-4 illustrate a wheel rim cover assembly 100 for use with a vehicle wheel rim. The wheel rim assembly 100 comprises a rim cover element 102, a rotating element 108, and a controller element 138. The wheel rim assembly 100 is customizable to fit automobile rims of cars, trucks, sports utility vehicles, and the like. The wheel rim assembly 100 is typically aluminum alloy or plastic in construction, although it is contemplated that the wheel rim assembly 100 may comprise a variety of materials such as but not limited to aluminum, steel, metal alloys, and the like, or any other material used in wheel/rim manufacturing.

The rim cover element 102 is a generally circular in shape similar to existing rim covers. The rim cover element 102 is attachable to an outside of a rim of a tire with a wire rim holder 104 or with a plurality of attachment holes 106 that slide over a tire's lug nuts. The wire rim holder 104 simply snaps in place around the rim of the tire, or the rim cover element 102 is held in place by tightening the lug nuts with the rim cover element 102 sandwiched against the rim of the tire. Once in place, the rim cover element 102 typically substantially covers the outside of the vehicle wheel rim. The rim cover element 102 may comprise a variety of designs, such as but not limited to star shapes, fins, wheel spokes, fan blades, cobras, dragons, choppers, katanas, and the like.

Figure 2:
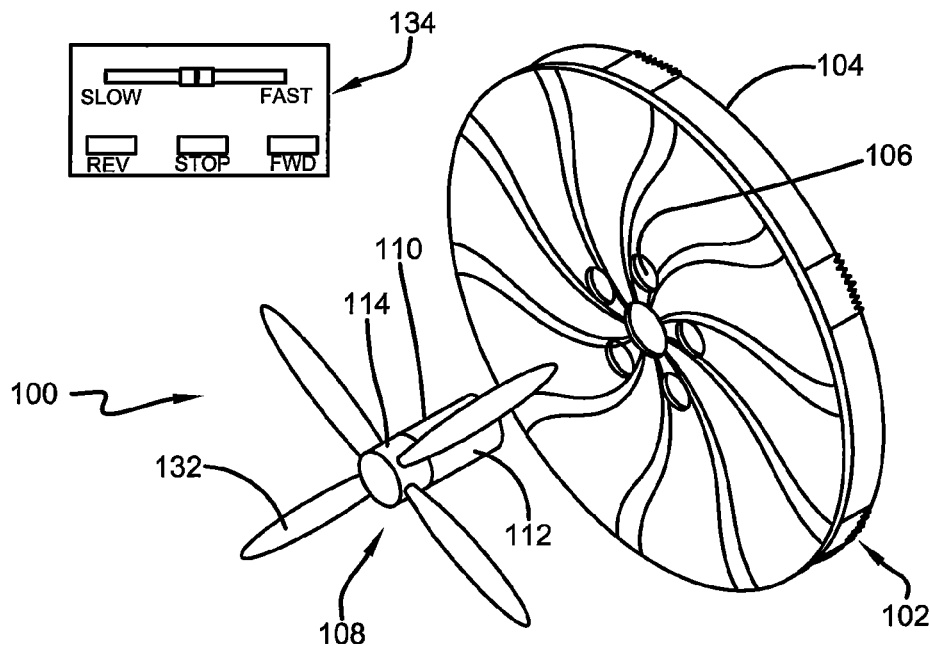
FIG. 2 illustrates an exploded view of the wheel rim cover assembly in accordance with the disclosed architecture.
Figure 3:
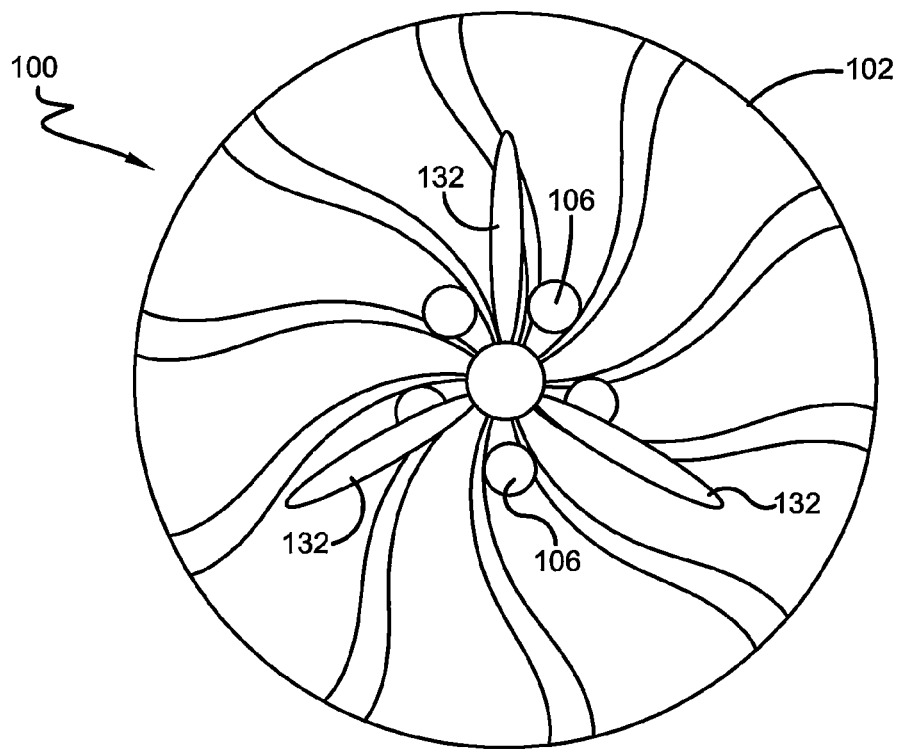
FIG. 3 illustrates a perspective view of the wheel rim cover assembly in accordance with the disclosed architecture.
Figure 4:
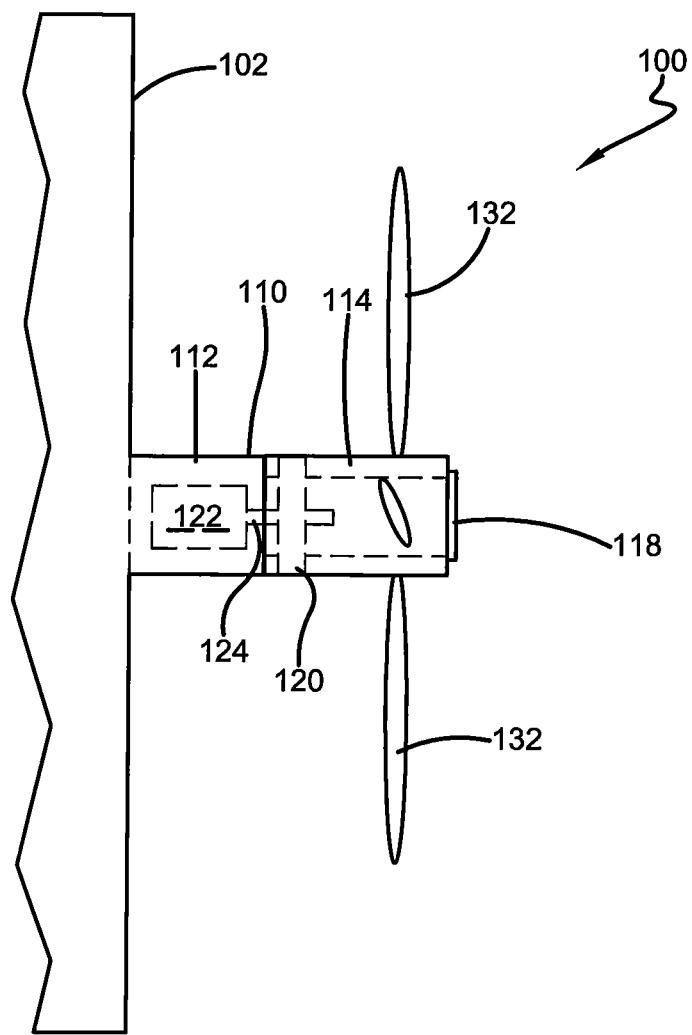
FIG. 4 illustrates a side view of the wheel rim cover assembly in accordance with the disclosed architecture.

As illustrated in FIG. 2, the rotating element 108 comprises a hub 110, a motor 122, and at least one blade 132. The hub 108 comprises a first portion 112 and a second portion 114. The first portion 112 is generally a substantially hollow tube either integrated with or removably attached to and extending perpendicularly from a center portion of the rim cover element 102. The second portion 114 is rotatably attached to the first portion 112 typically via a bearing component 120. The second portion 114 is similarly a substantially hollow tube or a collar that comprises an end cap 118. The second portion 114 may therefore extend from or partially surround or encapsulate the first portion 112. The end cap 118 is removable so that a user may access the first portion 112 through a substantially hollow interior of the second portion 114 allowing removal of the second portion 114 and/or first portion 112. This allows the user to replace the rotating element 108 or a portion of the rotating element 108 with a plurality of rotating elements (not shown) to change the design of the wheel rim cover assembly 100 as discussed infra.

The at least one blade 132 may comprise a plurality of blades that extend from the second portion 114 of the hub 110. Typically, the at least one blade 132 is integrated or molded into the second portion 114 so that the at least one blade 132 extends outward from the hub 110 substantially perpendicularly so that the at least one blade runs substantially parallel to the rim cover element 102. The plurality of blades may comprise a plurality of shapes such as, but not limited to fins, stars, fan blades, cobras, dragons, choppers, katanas, and the like. The at least one blade 132 may number between one and twenty blades.

The motor 122 is typically substantially encased or housed within the first portion 112 of the hub 110. However, the motor 122 may alternatively be located within the vehicle wheel rim as well. The motor 122 comprises a driveshaft 124 rotatably connected to the second portion 114 so that when engaged, the driveshaft 124 will rotate the second portion 114 around the bearing component 120. The wheel rim cover assembly 100 may further comprise a battery (not shown) for powering the motor 122. The battery may be housed within the hub 110 of the rotating element 108, the controller element 134, or anywhere in a vehicle employing the wheel rim cover assembly 100 such as in a trunk. The battery may be rechargeable with electricity, kinetic energy from the motion of the vehicle, or solar power. Alternatively, the motor 122 may be wired into the vehicle so that it runs off of a vehicle battery or a vehicle engine.

The rotating element 108 further comprises a speed control component and a directional control component which are electrically connected to the motor 122. Both the speed control element and the directional control element are typically housed within the first portion 112 of the hub 100, although they may both be located anywhere in or on the wheel rim cover assembly 100 as long as they are in communication with the motor 122 and the controller element 134. The speed control component allows the user to control a rotational speed of the rotating element 108. Additionally, the speed control component is in either wired or wireless communication with the controller element 134. Typically the speed control component is a variable speed switch. The directional control component allows the user to select a spin direction of the rotating element 108. The directional control component permits rotation of the rotating element 108 in either a clockwise or counter clockwise direction. Therefore, the at least one blade 132 may rotate independently of the rotation of the vehicle wheel.

The controller element 134 is typically a touch screen or equivalent device locatable within a cab of the vehicle. The controller element 134 is in electrical or wireless communication with the rotating element 108. To activate the wheel rim assembly 100, the user inputs directions into the controller element 134 selecting the speed of rotation for the rotating element 108. Similarly, the user selects and inputs a direction of rotation into the controller element.

In use, the wheel rim cover assembly 100 allows the user to customize the appearance of the vehicle. The user may create a visual illusion that the vehicle is in motion when the vehicle is stationary by adjusting the speed control component so that the rotational component 108 is activated and the at least one blade 132 begins to spin. As such, even though the vehicle is stationary, the spin of the at least one blade 132 provides the illusion of movement. A different visual illusion may be created when the vehicle is in motion. An "Air Floater Effect" occurs when the speed control component is activated along with the directional control component to rotate the at least one blade 132 in the opposite direction of the rotation of the vehicle wheel. As such, even though the vehicle is in motion, the spin of the at least one blade 132 in the opposite direction provides the illusion that the vehicle is floating in mid-motion.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wheel rim cover assembly for a vehicle wheel rim comprising:
   a rim cover element attached to and adapted to substantially cover an outside of the vehicle wheel rim;
   a rotating element; wherein the rotating element comprises a hub removeably connected to the rim cover element, a plurality of blades extending from the hub, a motor encased within the hub, and a speed control component in electronic communication with the motor for adjusting a rotational speed of the rotating element; and
   a controller element in electrical communication with the rotating element for remotely activating the rotating element.

2. The wheel rim cover assembly of claim 1, wherein the hub comprises a first portion attached to the rim cover element and a second portion rotatably attached to the first portion.

3. The wheel rim cover assembly of claim 2, wherein the second portion is rotatably attached to the first portion via a bearing component.

4. The wheel rim cover assembly of claim 3, wherein the plurality of blades extend outward from the second portion of the hub substantially parallel to the rim cover element.

5. A wheel rim cover assembly for a vehicle wheel rim comprising:
   a rim cover element attached to and adapted to substantially cover an outside of the vehicle wheel rim;
   a rotating element; wherein the rotating element comprises a hub removeably connected to the rim cover element, a plurality of blades extending from the hub, a motor encased within the hub, a speed control component in electronic communication with the motor for adjusting a rotational speed of the rotating element, and a directional control component in electronic communication with the motor for selecting a spin direction of the rotational element; and
   a controller element in wireless communication with the rotating element for activating the speed control component and the directional control component.

6. The wheel rim cover assembly of claim 5, wherein the directional control component allows the plurality of blades to spin clockwise and counterclockwise.

7. The wheel rim cover assembly of claim 5, wherein the hub comprises a first portion attached to the rim cover element and a second portion rotatably attached to the first portion via a bearing component.

8. The wheel rim cover assembly of claim 5, wherein the plurality of blades extend outward from the second portion of the hub substantially parallel to the rim cover element.

9. The wheel rim cover assembly of claim 5, wherein the speed control component is a variable speed switch.

* * * * *